Nov. 8, 1932.  G. B. PRATT  1,886,423
FLASH LIGHT SAFETY SWITCH
Filed April 16, 1930   3 Sheets-Sheet 1
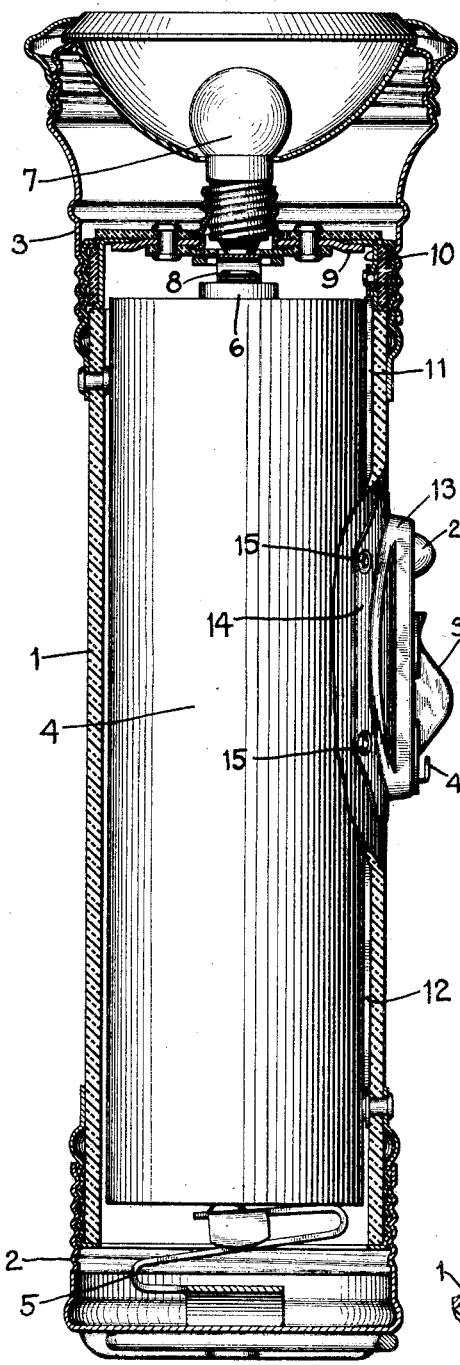
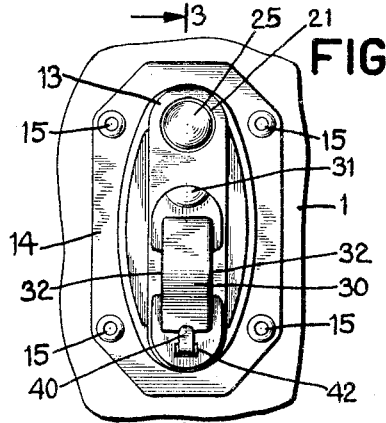
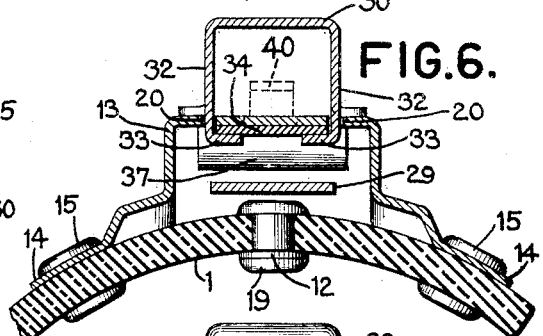
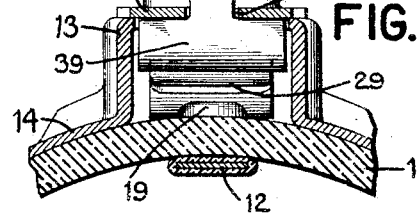
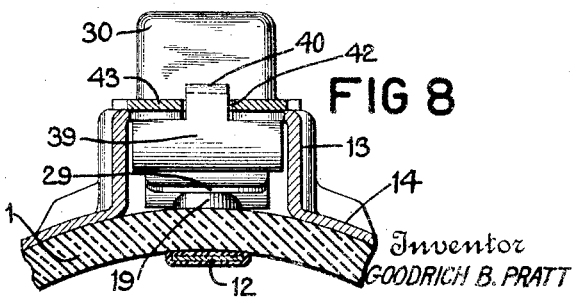
Inventor
GOODRICH B. PRATT
By his Attorneys
Bohleber + Ledbetter Nov. 8, 1932.  G. B. PRATT  1,886,423

FLASH LIGHT SAFETY SWITCH

Filed April 16, 1930   3 Sheets-Sheet 2

Inventor
GOODRICH B. PRATT
By his Attorneys
Bohleber + Ledbetter

Nov. 8, 1932.    G. B. PRATT    1,886,423
FLASH LIGHT SAFETY SWITCH
Filed April 16, 1930    3 Sheets-Sheet 3

Inventor
GOODRICH B. PRATT
By his Attorneys
Bohleber + Ledbetter

Patented Nov. 8, 1932

1,886,423

UNITED STATES PATENT OFFICE

GOODRICH B. PRATT, OF JERSEY CITY, NEW JERSEY, ASSIGNOR TO BOND ELECTRIC CORPORATION, OF JERSEY CITY, NEW JERSEY, A CORPORATION OF DELAWARE

FLASH LIGHT SAFETY SWITCH

Application filed April 16, 1930. Serial No. 444,662.

The present invention relates to flash lamps and embodies, more specifically, an improved contact or switching mechanism for illuminating such lamps either steadily or intermittently in the form of suitable flashes.

More particularly, the invention embodies a switch mechanism of the above character in which the contacting portions thereof are effectively locked in an off position to prevent the accidental illumination of the lamp. It is a matter of common knowledge that flash lamps are frequently illuminated inadvertently and the batteries thereof consequently run down since the switch mechanism frequently is engaged by projecting members or other surfaces, the force of which serves to actuate the switch and illuminate the lamp. While provision has been made against such accidental manipulation, the resulting structures have not proved entirely satisfactory since the elements thereof are either too costly to manufacture or else of such character that they readily fall into disrepair and require constant servicing. Switch mechanisms which merely yieldingly restrain the contacting portions thereof against movement into a closed position are impractical since the parts thereof are frequently accidentally engaged with such force as to overcome the restraining force and cause the switch to be closed.

An object of the present invention, accordingly, is to provide a switch mechanism for flash lamps which affords a position in which the lamp is illuminated steadily as well as a flashing position and an off position, in which latter position, the mechanism is adapted to be locked.

A further object of the invention is to provide a switch of the above character, the parts of which are positively locked against accidental movement when in an off position.

A further object of the invention is to provide a switch of the above character, the parts of which are simple of construction and readily assembled, being furthermore of considerable strength and fully capable of withstanding the stresses and strains ordinarily received in use.

Further objects, not specifically enumerated above, will be apparent as the invention is described in greater detail in connection with the accompanying drawings, wherein:

Figure 1 is a view in section, taken in a plane passing through the axis of a flash lamp provided with a switch constructed in accordance with the present invention.

Figure 2 is a plan view showing the switch mechanism of the present invention.

Figure 6 is a transverse sectional view, showing the switch in off position, taking in the planes indicated by the broken lines 6—6 of Figure 3.

Figure 7 is a view in section, taken on line 7—7 of Figure 3, and looking in the direction of the arrows.

Figure 8 is a view in section, taken on line 8—8 of Figure 4, and looking in the direction of the arrows.

Figure 11:
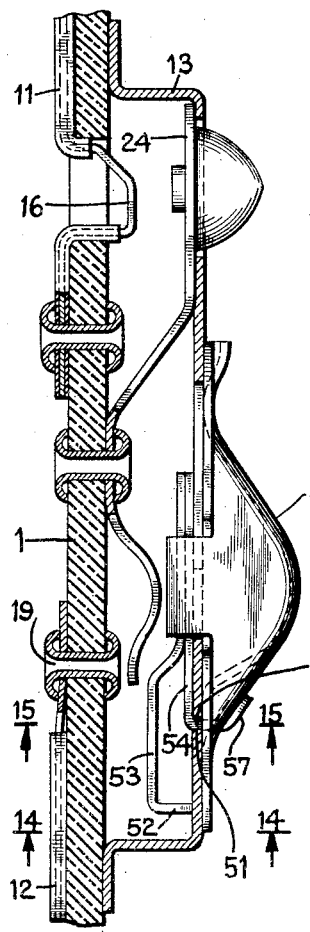
Figure 11 is a view in section, similar to Figure 3, showing a modified form of switch mechanism.
Figure 12:
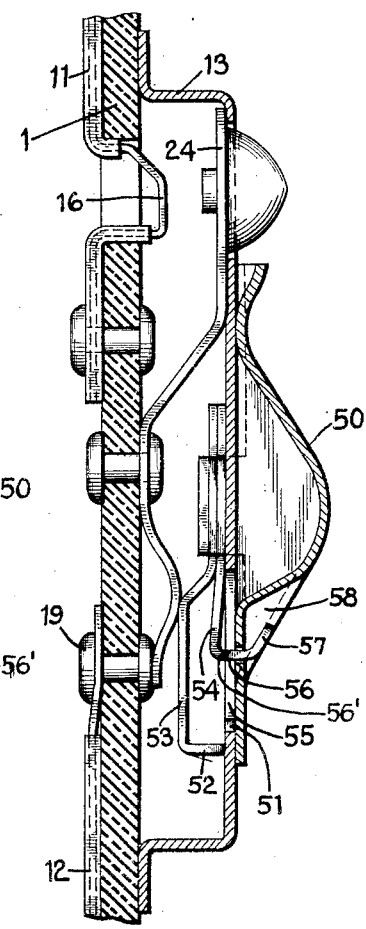
Figure 12 is a view in section, similar to Figure 11, showing the parts thereof moved into flashing position.
Figure 13:
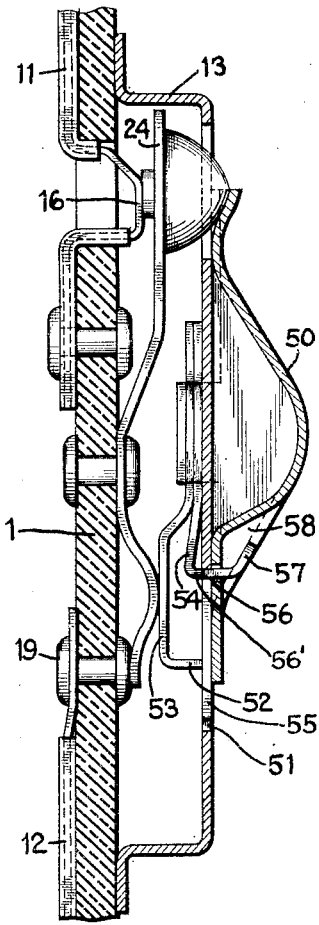
Figure 13 is a view in section, similar to Figure 11, and showing the switch elements moved into a position for steadily illuminating the flash lamp.
Figure 14:
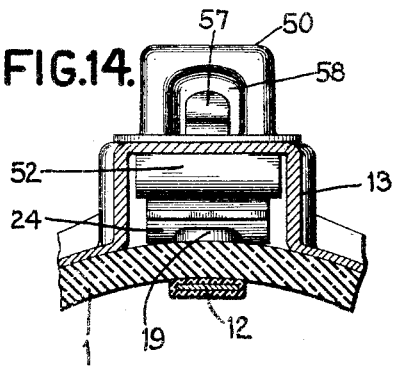
Figure 14 is a view in section, taken on line 14—14 of Figure 11, and looking in the direction of the arrows.
Figure 15:
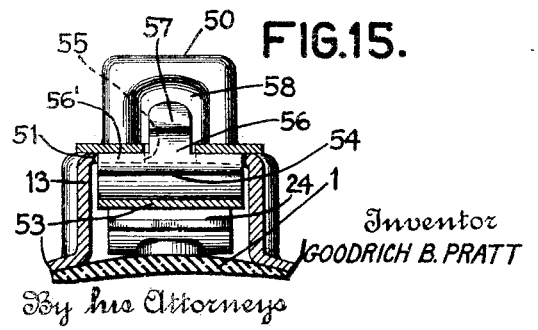
Figure 15 is a view in section, taken on line

15—15 of Figure 11, and looking in the direction of the arrows.

Referring to the above drawings, a flashlight casing or tube is shown at 1 having a bottom cap 2, and a hood 3. These caps are threaded upon the tube in the usual fashion and a battery 4 is received within the tube. Electrical communication between the battery and bottom cap 2 is provided through contact strip 5 and the central terminal 6 of the battery 4 engages the central terminal of lamp bulb 7 through a spring strip 8. A conducting plate 9 mounts the bulb in position and the lamp circuit is completed through a flanged retaining member 10, carried within the tube 1, and connected to a top contact strip 11. Bottom contact strip 12 is suitably secured to the tube and connected with the bottom cap 2 in the usual fashion. The foregoing structure is of well known character and forms no part of the present invention. Upon the surface of the tube 1, a contact box 13 or housing is mounted, the box being formed with flanges 14 which are curved to conform to the surface of the tube and secured thereto by means of eyelets 15. In this manner, the contact box is insulated from both contact strips 11 and 12 and forms no part of the electrical circuit.

An aperture 15a is formed in the tube 1 and receives an offset portion 16 of the contact strip 11, the insulation over this offset portion being removed in order that such portion may serve as a switch terminal. The lower end 17 of the contact strip 11 is secured to the tube by an eyelet 18 which is located within the contact box 13. Bottom contact strip 12 is secured to the tube 1 by means of an eyelet 19 which extends within the contact box 13 and forms one terminal of a switch to be described hereinafter.

The contact box is provided with spaced parallel slots 20 intermediate the ends thereof and an aperture 21 at one end thereof over the offset portion 16 of the contact strip 11. Below the slots 20 a T-shaped slot 22 is formed in the contact box, the arms 23 thereof extending transversely of the box.

Figure 3:
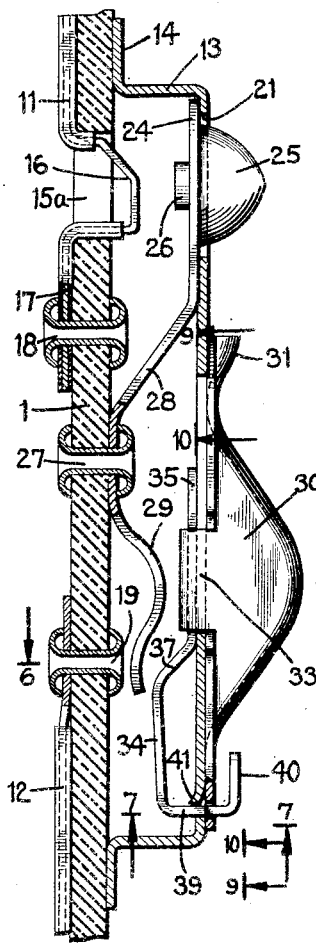
Figure 3 is a view in section, taken on line 3—3 of Figure 2, and looking in the direction of the arrows, the switch being illustrated in an off position.
Figure 4:
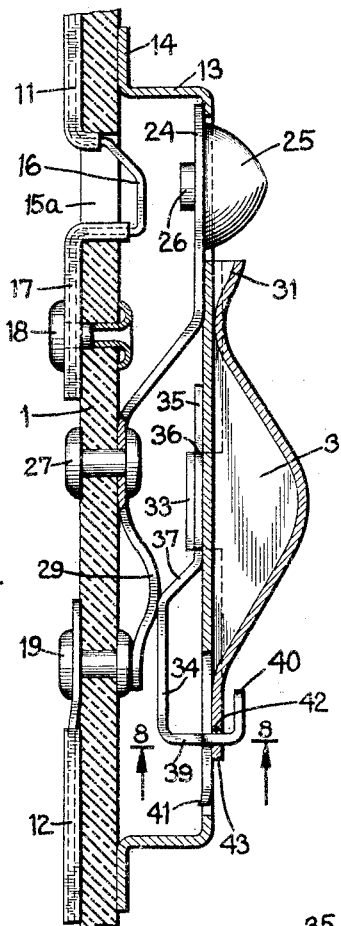
Figure 4 is a view in section, similar to Figure 3, showing the switch in its flashing position.
Figure 5:
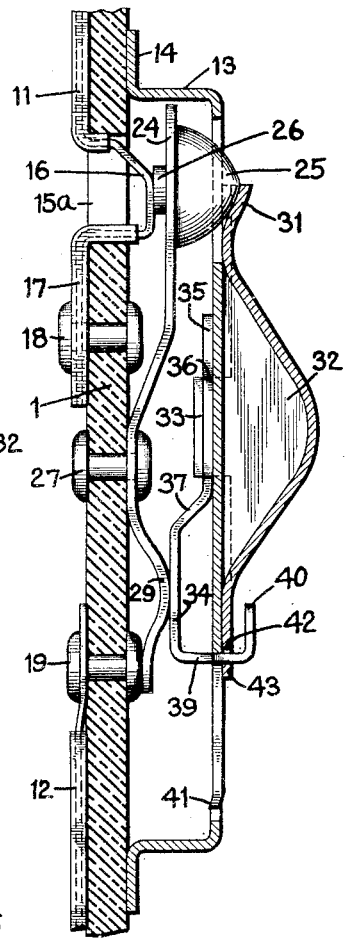
Figure 5 is a view in section, similar to Figure 3, showing the switch closed in its steadily illuminating position.

A contact strip 24 mounts a button 25 which extends through the aperture 21 and also carries a terminal 26 which is adapted to engage the bare offset portion 16, above described, and form a main circuit closer. Spring contact strip 24 is secured intermediate its ends to the tube 1 by an eyelet 27. A flexing portion 28 is provided to maintain the button 25 normally in the position shown in Figures 3 and 4 and a curved extension 29 is formed on the spring 24 to be cammed downwardly into engagement with the eyelet 19 as shown in Figures 4 and 5 thus forming an auxiliary circuit closure. It will thus be seen that both ends of contact strip 24 must be depressed to complete the circuit between contact strips 11 and 12.

A slide 30 is adapted to ride upon the top surface of the contact box 13 and is formed to resemble a hollow semi-discoid having an upper curved camming portion 31 to engage the button 25 and depress the same as shown in Figure 5. The parallel sides 32 of the slide 30 are formed with downwardly extending flanges 33 which pass through the slots 20 and are turned over to retain the slide upon the contact box.

Figure 9:
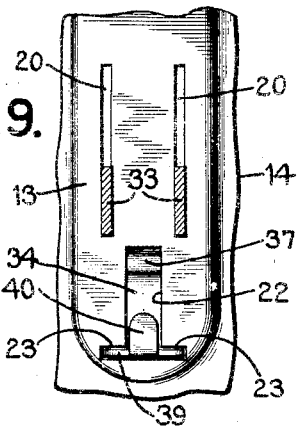
Figure 9 is a view in section, taken on line 9—9 of Figure 3, and looking in the direction of the arrows.
Figure 10:
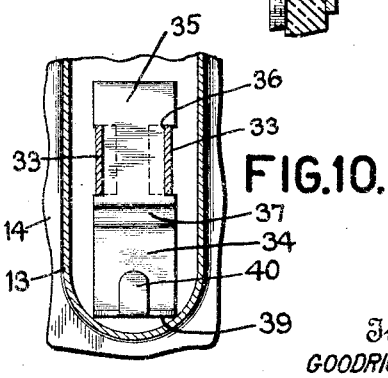
Figure 10 is a view in section, taken on line 10—10 of Figure 3, and looking in the direction of the arrows.

Within the contact box, a spring camming strip 34 is mounted, an extension 35 thereof being formed with notches 36 to receive the flanges 33 and cause the strip 34 to move with the slide 32. A curved or offset portion 37 engages the cam strip 29 in the forward movement of the slide to depress the strip into the position shown in Figures 4 and 5, thus completing one actuation necessary to close the lamp circuit. An upwardly extending flange 39 is formed on the strip 34 having a reentrant pressure plate 40 of restricted width. This plate is adapted to ride within the longitudinal portion of the T-shaped slot 22 with the laterally extending portions of the flange 39 upon either side of the pressure plate 40 which is normally adapted to engage the transverse portions 23 of the T-shaped slot. This is clearly shown in Figures 3 and 9, the top edges of the transverse portions 23 preferably being curved downwardly as at 41 to more effectively maintain the parts in locked position.

A slot 42 is formed in the bottom plate extension 43 of the slide 30 to receive the pressure plate 40 and facilitate the actuation thereof simultaneously with the movement of the slide 30 upwardly. In operation, the slide 30 is normally locked in the position shown in Figure 3 by the spring cam member 39. In this position, the electrical circuit is broken and depressing button 25 will not serve to illuminate the lamp. To advance the slide 30 upwardly, the pressure plate 40 must be depressed to disengage the shoulders of the flange 39 with the edges 41 of the slots 23. After such disengagement, the slide may be advanced into the position shown in Figure 4, the shoulders 39 riding beneath the contact box and at which time the strip 29 is cammed downwardly against the eyelet 19 and contact strip 24 brought into electrical communication with the bottom contact strip 12. The button 25 may now be depressed to effect flashing of the lamp in a well known manner.

By advancing the slide 30 still further, the cam 31 engages the button 25 to force it downwardly and thus complete the circuit at both ends of the contact strip 24 to illuminate the lamp steadily.

In the construction shown in Figures 11, 12, 13, 14 and 15, the tube 1 is provided with a contact strip 24 which is housed within contact box 13 in a manner similar to that described in connection with Figures 1 through 10. The top and bottom contact strips 11 and 12, respectively, are secured to the tube to provide the switch terminals 16 and 19, also as described in connection with Figures 1 through 10 and a slide 50 is secured to the contact box 13 similar to the manner in which slide 30 is secured thereto in the above construction.

Instead of providing the cam member with a locking element as described hereinbefore, the cam member 53 terminates in an upwardly extending flange 52 which bears against the inner surface of the contact box to form a rigid cam. Carried with the cam member 53 in the flanges 33 and between the cam member and the contact box is a locking member 54 which is upwardly bent as at 56' and terminates in shoulders 56 from which the reentrant pressure tongue 57 extends through a slot 50' in the bottom plate extension of the slide 50.

A T-shaped slot formed by a longitudinally extending slot 55 and transverse slot 51, is formed in the box 13 the slot 51 receiving the upwardly extending portion 56', formed on the locking strip 54 in off position illustrated in Figure 11. A recess 58 is formed in the slide 50 to receive the upwardly extending and reentrant portion 57 of strip 54 and protect the same from accidental actuation.

From the foregoing, it will be seen that the slide is locked in its off position. Before movement of the slide from such position may be effected, sufficient pressure must be exerted upon the tongue 57 to disengage the shoulders 56 from the transverse portion 51 of slot 55. After such disengagement, the slide may be advanced along the box the shoulders 56 riding beneath the inner surface of the box to the successive switching positions assumed as described hereinbefore.

While the invention has been described with specific reference to the accompanying drawings, it is not to be limited, save as defined in the appended claims.

I claim as my invention:—

1. A device of the character described comprising a contact box, spaced switch terminals therein, a contact strip secured in the box intermediate its ends, the terminals lying adjacent the ends of the strip, a slide mounted on the box, means on the slide to depress one end of the strip, and means on the last named means to lock the slide against movement.

2. A device of the character described comprising a contact box, spaced switch terminals therein, a contact strip secured in the box intermediate its ends, the terminals lying adjacent the ends of the strip, a slide mounted on the box, means on the slide to depress one end of the strip, and means on the last named means extending through the box to lock the slide against movement.

3. A device of the character described comprising a contact box, spaced switch terminals therein, a contact strip secured in the box intermediate its ends, the terminals lying adjacent the ends of the strip, a slide mounted on the box, means on the slide to depress one end of the strip, and means on the last named means extending through the box and slide to lock the slide against movement.

4. A device of the character described comprising a contact box, spaced switch terminals therein, a contact strip secured in the box intermediate its ends, the terminals lying adjacent the ends of the strip, a slide mounted on the box, means on the slide to depress one end of the strip, a slot in the box, and means on the depressing means to engage the slot.

5. A device of the character described comprising, a contact box, spaced switch terminals therein, a contact strip secured in the box intermediate its ends, the terminals lying adjacent the ends of the strip, a slide mounted on the box, means on the slide to depress one end of the strip, a slot in the box, and means on the depressing means to engage the slot, said means passing through the slot.

6. A device of the character described comprising a contact box, spaced switch terminals therein, a contact strip secured in the box intermediate its ends, the terminals lying adjacent the ends of the strip, a slide mounted on the box, means on the slide to depress one end of the strip, a slot in the box, locking portions in said slot, and means on the depressing means to engage the locking portions.

7. A device of the character described comprising a contact box, spaced switch terminals therein, a contact strip secured in the box intermediate its ends, the terminals lying adjacent the ends of the strip, a slide mounted on the box, means on the slide to depress one end of the strip, a T-shaped slot in the box, and means on the depressing means to engage portions of the slot.

8. A device of the character described comprising a contact box, spaced switch terminals therein, a contact strip secured in the box intermediate its ends, the terminals lying adjacent the ends of the strip, a slide mounted on the box, means on the slide to depress one end of the strip, a slot in the box having transverse extensions, and means on the depressing means to engage the transverse extensions.

9. A device of the character described comprising a contact box, spaced switch terminals therein, a contact strip secured in the box intermediate its ends, the terminals lying adjacent the ends of the strip, a slide mounted on the box, means on the slide to depress one end of the strip, a slot in the box, and means on the depressing means extending through the slot.

10. A device of the character described comprising a contact box, spaced switch terminals therein, a contact strip secured in the box intermediate its ends, the terminals lying adjacent the ends of the strip, a slide mounted on the box, means on the slide to depress one end of the strip, a slot in the box, means on the box to lock the slide, an extension on the depressing means passing through the slot, and shoulders on the last named means to engage the locking means.

11. A device of the character described comprising a contact box, spaced switch terminals therein, a contact strip secured in the box intermediate its ends, the terminals lying adjacent the ends of the strip, a slide mounted on the box, means on the slide to depress one end of the strip, a slot in the box having transverse extensions, an extension on the depressing means passing through the slot, and shoulders on the extension engaging the transverse portions of the slot.

12. A device of the character described comprising a contact box, spaced switch terminals therein, a contact strip secured in the box intermediate its ends, the terminals lying adjacent the ends of the strip, a slide mounted on the box, means on the slide to depress one end of the strip, a slot in the box having transverse extensions, an extension on the depressing means passing through the slot, and shoulders on the extension engaging the transverse portions of the slot, certain edges of the transverse portions being bent toward the depressing means to be engaged by the shoulders.

13. A device of the character described comprising a contact box, spaced switch terminals therein, a contact strip secured in the box intermediate its ends, the terminals lying adjacent the ends of the strip, a slide mounted on the box, a resilient cam strip in the box and carried by the slide to depress one end of the first strip, an upwardly extending portion on the cam strip formed with a portion of reduced width extending through a slot in the box, and a turned over portion on the last named portion.

14. A device of the character described comprising a contact box, spaced switch terminals therein, a contact strip secured in the box intermediate its ends, the terminals lying adjacent the ends of the strip, a slide mounted on the box, a resilient cam strip in the box and carried by the slide to depress one end of the first strip, an upwardly extending portion on the cam strip formed with a portion of reduced width extending through a slot in the box, a turned over portion on the last named portion, and shoulders on the upwardly extending portion engaging portions of the slot.

15. A device of the character described comprising a contact box, spaced switch terminals therein, a contact strip secured in the box intermediate its ends, the terminals lying adjacent the ends of the strip, a slide mounted on the box, a resilient cam strip in the box and carried by the slide to depress one end of the first strip, an upwardly extending portion on the cam strip formed with a portion of reduced width extending through a slot in the box, said last named portion also extending through a slot in the slide, a turned over portion on the last named portion, and shoulders on the upwardly extending portion engaging portions of the slot.

16. A device of the character described comprising a contact box, spaced switch terminals therein, a contact strip secured in the box intermediate its ends, the terminals lying adjacent the ends of the strip, a slide mounted on the box and formed with a slot, a cam strip in the box carried with the slide to depress one end of the first strip, a T-shaped slot in the box, an upwardly extending portion on the cam strip to engage the box, and a locking member carried with the slide and extending through slots in the slide and box and having a portion to engage an arm of the T-shaped slot.

17. A circuit closer for flashlights comprising a contact box, spaced contacts therein, a slide on the box, actuating means movable with the slide to close the spaced contacts, and means carried by the actuating means to lock the slide against movement.

18. A circuit closer for flashlights comprising a contact box, contacts therein, means to engage the contacts when actuated, a slide on the box, a slot in the box having a shoulder, means movable with the slide to actuate the first named means and means in the slot carried with the slide to engage the shoulder.

19. A circuit closer for flashlights comprising a contact box, contacts therein, means to engage the contacts when actuated, a slide on the box, a T-shaped slot in the box, means movable with the slide to actuate the first named means and means in the slot carried with the slide to engage an arm of the T-shaped slot.

20. A circuit closer for flashlights comprising a contact box, contacts therein, means to close an electrical circuit through the contacts, a slide on the box, a recess in the slide, means movable with the slide to actuate the first named means and means carried with the slide and disposed in the recess to lock the slide against movement.

In testimony whereof I affix my signature.

GOODRICH B. PRATT.